C. B. VISNESS.
PIPE WRENCH.
APPLICATION FILED MAY 3, 1912.
1,042,175.
Patented Oct. 22, 1912.
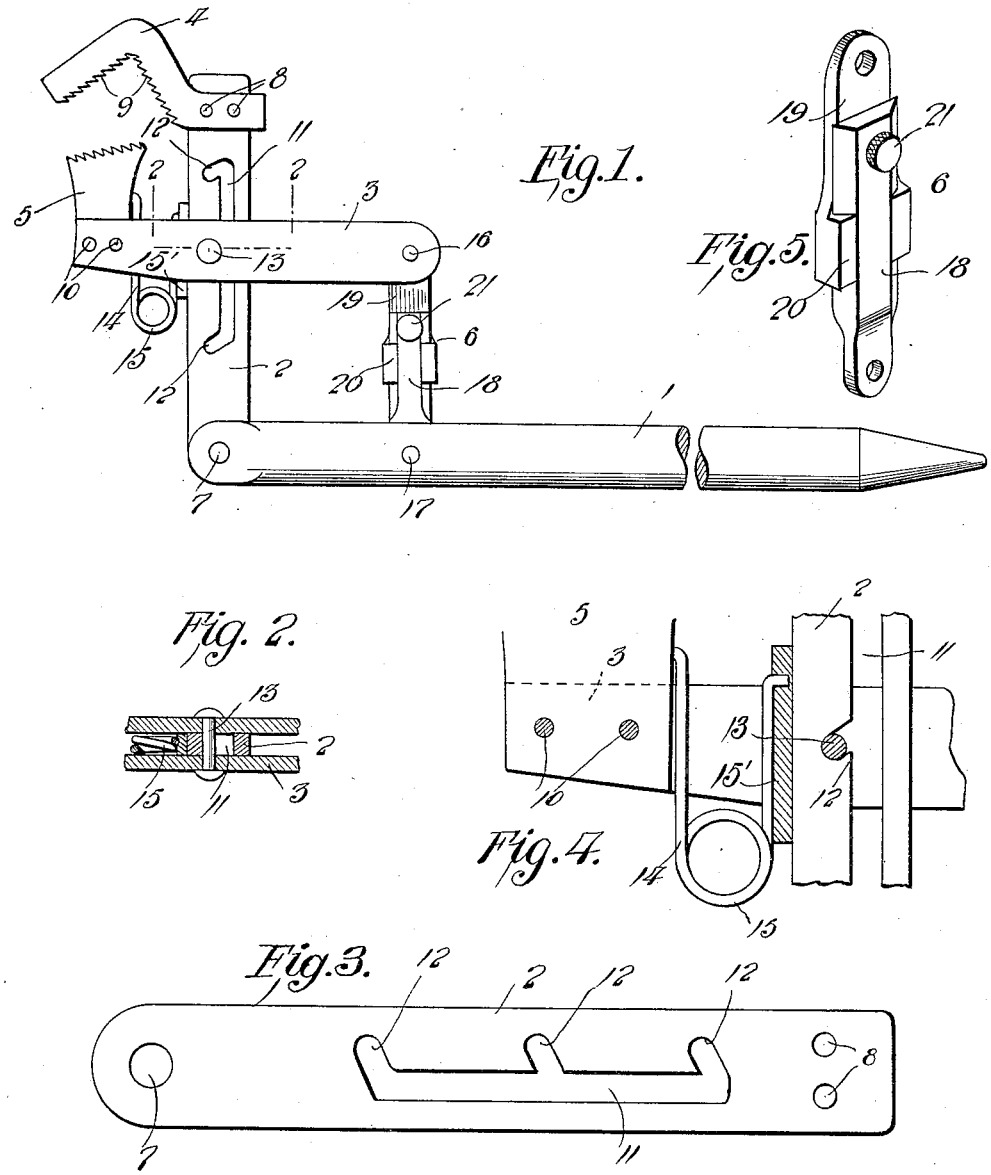
Witnesses
Carroll Bailey.
R. M. Smith.
Inventor
C. B. Visness,
By Victor J. Evans
Attorney

UNITED STATES PATENT OFFICE.

CARL B. VISNESS, OF MEKINOCK, NORTH DAKOTA.

PIPE-WRENCH.

1,042,175.   Specification of Letters Patent.   Patented Oct. 22, 1912.

Application filed May 3, 1912. Serial No. 694,850.

*To all whom it may concern:*

Be it known that I, CARL B. VISNESS, a citizen of the United States, residing at Mekinock, in the county of Grand Forks and State of North Dakota, have invented new and useful Improvements in Pipe-Wrenches, of which the following is a specification.

This invention relates to pipe wrenches, the object in view being to provide a device of the character specified which will automatically grip a pipe or other object between the jaws thereof, and also automatically release its grip on such device, when the wrench is moved in an opposite direction.

A further object of the invention is to provide means, whereby the distance between the jaws may be primarily regulated, so as to accommodate the device, as a whole, to pipes, rods, or other objects of different sizes.

With these and other objects in view, the invention consists in the construction, combination and arrangement of parts, as will be hereinafter more fully described, illustrated in the accompanying drawings, and pointed out in the claims hereunto appended.

In the accompanying drawings: Figure 1 is a side elevation of a pipe wrench, embodying the present invention. Fig. 2 is a cross sectional view through the same on the line 2—2 of Fig. 1. Fig. 3 is a plan view of the main shank. Fig. 4 is a detail view of the spring. Fig. 5 is a detail perspective view of the link. Fig. 6 is a detail perspective view of the spring block.

The pipe wrench contemplated in this invention comprises essentially a handle 1, a main shank 2, a pivoted secondary shank 3, jaws 4 and 5, and a link 6.

The handle 1 may be of any suitable length, according to the use for which the wrench is designed. The main shank 2 is pivotally connected at one extremity, at the point 7, to the end of the handle 1, and has the jaw 4 fixedly connected thereto, as shown at 8. The jaw 4 is angular or consists of two parts extending substantially at right angles to each other, and provided on their inner faces with teeth or serrations 9 for better gripping the pipe or other object to be operated upon. The jaw 5 is fixedly connected, at 10, to the outer end of the pivoted shank 3.

The main shank 2 is provided with a longitudinal slot 11 having at one side thereof notches or offsets 12 adapted to receive a fulcrum pin 13 carried by the pivoted shank 3. While the main shank 2 is preferably formed in one piece, the pivoted shank 3 is formed of two parallel bars, as shown, which straddle or embrace the single or main shank 2 and carry the pin 13, thereby enabling said pin to be moved into any one of the notches or offsets 12 of the slot 11.

In order to hold the pin 13 in the selected notch 12, a spring 14 is arranged at the outer side of the main shank 2, said spring embodying a coil 15 and arms projecting therefrom, one of which is connected to the jaw 5, while the other arm is connected to a sliding block 15′ extending through the shank 3 and having T-shaped ends to retain it in place. At its rear end, the pivoted shank 3 is connected by the link 6 to the handle 1, said link being pivotally connected at its opposite ends to said members, as shown at the points 16 and 17.

The link 6 is made up, as shown in Fig. 5, wherein it is seen to comprise two relatively slidable and overlapping members 18 and 19, the member 19 being provided with inwardly extending undercut or dove-tailed flanges 20, while the member 18 is dove-tailed in cross section, so as to slide easily between the two flanges. The screw 21 connects the two members under any relative adjustment thereof, and in this way the link as a whole may be extended or contracted in length to adjust the relative distance between the jaws of the wrench. The spring block 15′ passes through the shank 3 and is provided with T-shaped ends, as shown in Fig. 6, to prevent the displacement of said block as it slides against the shank 2.

It will now be understood that as the handle 1 is swung in one direction, the jaws of the wrench are caused to move toward each other, thereby gripping the pipe or other object between them. When the handle 1 is swung in the opposite direction, the jaws are moved away from each other, thereby releasing their hold on the object. The wrench is automatic both in its gripping and releasing action.

What is claimed is:

1. A wrench of the class set forth, comprising a handle, a stationary jaw, a main shank connecting said jaw with the handle and provided with a bayonet slot, embodying a plurality of fulcrum shoulders, a pivoted shank, a movable jaw thereon, a link connecting the pivoted shank with the handle, a fulcrum pin on the pivoted shank adjustable in the bayonet slot, and a spring for retaining the fulcrum pin in engagement with any one of said shoulders.

2. A wrench of the class set forth, comprising a handle, a stationary jaw, a main shank connecting said jaw with the handle and provided with a bayonet slot, embodying a plurality of fulcrum shoulders, a pivoted shank, a movable jaw thereon, a longitudinally extensible link connecting the pivoted shank with the handle, a fulcrum pin on the pivoted shank adjustable in the bayonet slot, and a spring for retaining the fulcrum pin in engagement with any one of said shoulders.

In testimony whereof I affix my signature in presence of two witnesses.

CARL B. VISNESS.

Witnesses:
W. I. FORBES,
RAY K. HAMILTON.

Copies of this patent may be obtained for five cents each, by addressing the "Commissioner of Patents, Washington, D. C."